United States Patent

Onishi et al.

(10) Patent No.: US 9,366,758 B2
(45) Date of Patent: Jun. 14, 2016

(54) DETECTION DEVICE

(75) Inventors: Yuriko Onishi, Nishinomiya (JP);
Satoshi Misonoo, Nishinomiya (JP)

(73) Assignee: FURUNO ELECTRIC COMPANY LIMITED, Hyogo (JP)

(*) Notice: Subject to any disclaimer, the term of this patent is extended or adjusted under 35 U.S.C. 154(b) by 770 days.

(21) Appl. No.: 13/098,685

(22) Filed: May 2, 2011

(65) Prior Publication Data

US 2011/0273963 A1 Nov. 10, 2011

(30) Foreign Application Priority Data

May 6, 2010 (JP) ................................. 2010-106103

(51) Int. Cl.
| G01S 15/00 | (2006.01) |
| G01S 15/96 | (2006.01) |
| G01S 7/292 | (2006.01) |
| G01S 7/527 | (2006.01) |
| G01S 7/62 | (2006.01) |

(52) U.S. Cl.
CPC ............... G01S 15/96 (2013.01); G01S 7/2927 (2013.01); G01S 7/527 (2013.01); G01S 7/6218 (2013.01)

(58) Field of Classification Search
USPC ................................................... 367/93, 87
See application file for complete search history.

(56) References Cited

U.S. PATENT DOCUMENTS

| 4,489,320 | A | * | 12/1984 | Lewis | .................. G01S 7/2928 342/160 |
| 7,753,091 | B2 | * | 7/2010 | Ozanne | ................ B67D 1/1238 141/198 |
| 8,359,178 | B2 | * | 1/2013 | Rowe | ...................... G01D 1/00 702/104 |
| 2008/0080316 | A1 | * | 4/2008 | Inouchi | ................... G01S 15/96 367/98 |
| 2008/0239870 | A1 | * | 10/2008 | Dubuis | .................... G01S 7/539 367/21 |
| 2008/0284638 | A1 | * | 11/2008 | Kajio | ........................ G01S 7/02 342/59 |

FOREIGN PATENT DOCUMENTS

| JP | 11-202050 A | 7/1999 |
| JP | 2003-43134 A | 2/2003 |
| JP | 2003-322678 A | 11/2003 |

* cited by examiner

*Primary Examiner* — Naomi Small
(74) *Attorney, Agent, or Firm* — Global IP Counselors, LLP (57) ABSTRACT

This disclosure provides a detection device, which includes a transceiving module for transmitting a transmission signal and receiving an echo caused by the transmission signal to output a reception signal according to an intensity of the echo, a memory module for storing the reception signals for a plurality of measurements, and an interference detecting module for detecting an interference signal from the reception signals, the interference detecting module determining that the reception signal contains the interference signal when the reception signal has an intensity difference with the previous reception signal by more than a predetermined threshold for over a reference time period in one measurement.

7 Claims, 6 Drawing Sheets

DETECTION DEVICE

CROSS-REFERENCE TO RELATED APPLICATION(S)

The application claims priority under 35 U.S.C. §119 to Japanese Patent Application No. 2010-106103, which was filed on May 6, 2010 the entire disclosure of which is hereby incorporated by reference.

TECHNICAL FIELD

The present invention relates to a device for transmitting and receiving a sound and/or an electromagnetic wave, and particularly relates to a detection device for detecting an echo and interference.

BACKGROUND OF THE INVENTION

Conventionally, devices, such as radar apparatuses and fish finders, for transmitting and receiving a sound and/or an electromagnetic wave perform various kinds of processing to remove interference caused by another device(s). For example, JP2003-322678A discloses a method that is performed in the fish finder, in which interference is detected based on whether a ratio of an amplitude of a reception signal from a measurement (current measurement) and an amplitude of a reception signal from a previous measurement is below a predetermined value.

The interference signal is unlikely to be detected continuously for a plurality of times at the same level and the same depth. The method disclosed in JP2003-322678A includes determining that the current reception signal is interference if the ratio of the amplitudes is a predetermined value or higher (i.e., if an intensity difference between the reception signals is large) and displaying it on a display using the previous reception signal.

However, because the method disclosed in JP2003-322678A determines as interference as long as the intensity difference is large, there is a possibility that a reception signal that is a normal echo of other than interference (a target object such as fish) may be determined as interference. For example, when the target object moves at a high speed in a depth direction, the echo signals of the current measurement and the previous measurement from the same target object may be detected at depths far apart from each other. In this case, when comparing the intensities of the current reception signal and the previous reception signal at the same depth, the intensity difference is determined to be large and thus the current reception signal is determined as the interference. Therefore, an echo image that should normally be displayed may become smaller in size or not displayed at all.

SUMMARY OF THE INVENTION

Thus, the present invention is made in view of the above situations, and provides a detection device that can detect interference more accurately comparing to the conventional device without performing the interference removal more than needed.

According to an aspect of the invention, a detection device is provided, which includes a transceiving module for transmitting a transmission signal and receiving an echo caused by the transmission signal to output a reception signal according to an intensity of the echo, a memory module for storing the reception signals for a plurality of measurements, and an interference detecting module for detecting an interference signal from the reception signals, the interference detecting module determining that the reception signal contains the interference signal when the reception signal has an intensity difference with the previous reception signal by more than a predetermined threshold for over a reference time period in one measurement.

Thereby, the detection device of this aspect determines that the reception signal is interference only when the intensity difference is continuously large (the threshold or larger) for over the reference time period. For example, in a fish finder, interference is determined only when an area of the reception signal with the large intensity difference has some extent of continuity in the depth direction. Therefore, an erroneous determination of interference in the reception signal is prevented when, for example, the echoes in the current measurement and the previous measurement from the same target object are detected at depths far apart from each other.

The detection device may further include an image output module for outputting the reception signals as echo images according to the intensities, wherein the interference detecting module sets the reference time period based on the total number of pixels of the image output module.

In a radar device and the fish finder, the operator visually determines whether it is interference or a target object from the echo image in the end, therefore, performing the interference detection per pixel to be displayed is desirable in the sight of processing load and accuracy.

The interference detecting module may repeat the determination of the interference signal for the reception signal from which the interference signal is removed.

For example, when the interference signals accidentally overlap with each other at the same depth in the reception signals, it is not detected as the interference in one time detection processing because the intensity difference between the interference signals is small. Therefore, by repeating the interference detection processing for the data after the interference removal, the accuracy can be improved. Note that, the interference detection is performed by, for example, outputting the previous reception signal without using the current reception signal, or, when the processing is not performed in real time (e.g., when the processing is performed after the reception signals for a plurality of extra measurements is accumulated), a value averaged by using the previous echo data and the next is outputted. By keeping the outputted value in a memory for a moment and repeatedly detecting interference, the interference detection can more accurately be performed.

The interference detecting module repeats the determination of the interference signal for the reception signal when the number of the interference signals contained in the reception signal is more than a reference value.

That is, after the interference is removed to some extent, the interference removal is not performed for more than needed.

The detection device may further include an interference removing module for removing the interference signal from the reception signal. The interference detecting module may repeat the determination of the interference signal for the reception signal from which the interference signal is removed.

That is, after the interference is removed to some extent, the interference removal is not performed for more than needed.

The interference removing module may remove the interference signal by replacing the interference signal with a value of the reception signal other than the interference signal.

Thereby, only the echo image of the interference can be removed and the echo image of a target object is hardly removed.

The interference removing module may remove the interference signal by replacing the interference signal with a corresponding value of the previous reception signal.

Thereby, only the echo image of the interference can be removed and the echo image of a target object is hardly removed.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENT

Next, an embodiment of the present invention is described with reference to the appended drawings.

Figure 1:
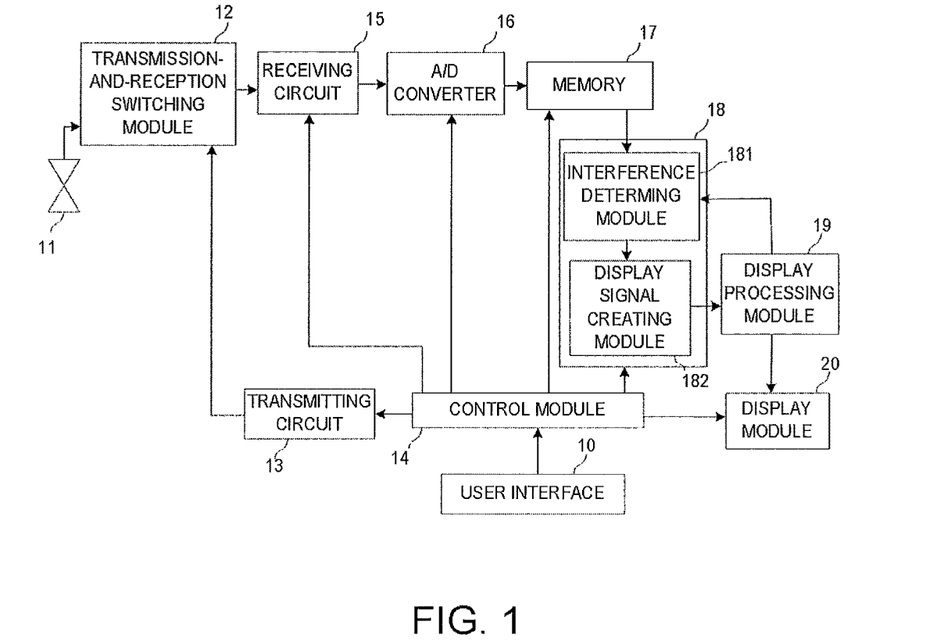
FIG. 1 is a block diagram showing a configuration of a fish finder according to an embodiment of the present invention.

FIG. 1 is a block diagram showing a configuration of a detection device utilized as a fish finder in this embodiment. The fish finder includes a user interface 10, a transducer 11, a transmission-and-reception switching module 12, a transmitting circuit 13, a control module 14, a receiving circuit 15, an A/D converter 16, a memory 17, a signal processing module 18, a display processing module 19, and a display module 20.

The control module 14 entirely controls the fish finder. The control module 14 receives an instruction input, such as setting a detecting range, from the user interface 10. The control module 14 responds to the input to set a transmitting period from the transmitting circuit 13 and the detecting range, set a corresponding period of a sampling pulse toward a A/D converter 16, generate write and read clocks and address for the memory 17, generate various processing signals to the signal processing module 18 and the display processing module 19, and transmit an instruction for executing calculation processing. The display module 20 displays reception data by having a vertical axis of a screen thereof as the depth direction and a horizontal axis thereof as a time direction.

The transmitting circuit 13 inputs a pulse shaped signal to the transducer 11, which serves as a transceiving module, via the transmission-and-reception switching module 12 internally built with a trap circuit. The transducer 11 is an oscillator that is attached to, for example, a ship's bottom, and outputs an ultrasonic wave (transmission signal) underwater in response to the pulse shaped signal inputted from the transmitting circuit 13.

The ultrasonic wave outputted from the transducer 11 reflects on a target object such as fish or the sea bottom and is received as an echo signal. The transducer 11 outputs a reception signal corresponding to an intensity or intensities of the received echo(es) to the reception circuit 15 via the transmission-and-reception switching module 12. The reception circuit 15 amplifies the inputted reception signal and outputs it to the A/D converter 16. The A/D converter 16 converts the reception signal into a digital signal at a predetermined sampling rate and stores it sequentially in the memory 17.

Figure 2:
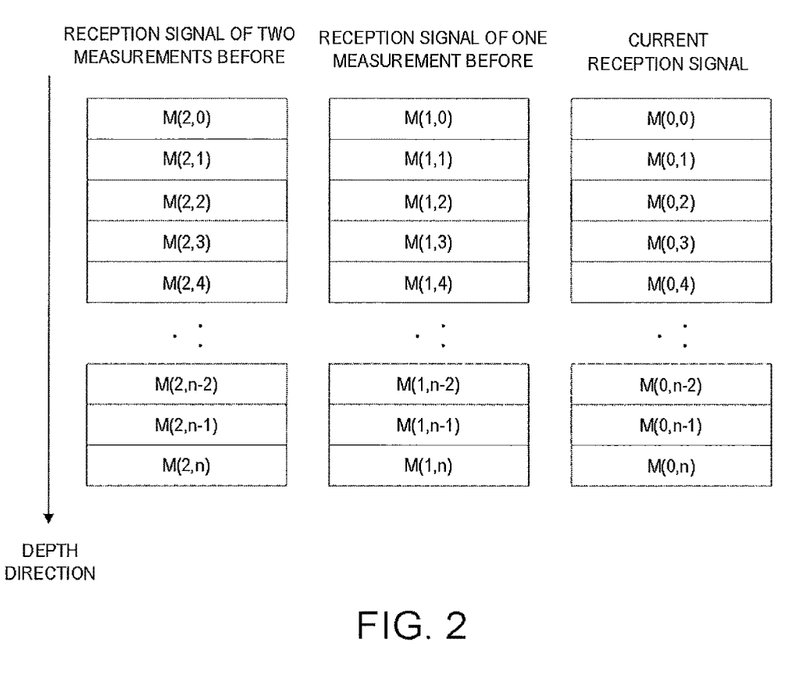
FIG. 2 is a table showing reception signals stored in a memory 17.

FIG. 2 is a table showing the reception signals stored in the memory 17. The memory 17 sequentially stores data of the reception signal obtained in a single measurement at a predetermined resolution in the depth direction (at a predetermined time period after the transmission of the ultrasonic wave), and stores data columns corresponding to a plurality of measurements. For example, in the latest (current) measurement, data with the least time difference from the transmission to the reception (data at the shallowest depth comparing to others in the column) is stored as M(0, 0) and, sequentially as M(0, 1) to M(0, n) at the resolution in the depth direction. Similarly, in a measurement of one measurement before (hereinafter, "one before" may be referred to as "previous"), data at the shallowest depth is stored as M(1, 0) and sequentially as M(1, 1) to M(1, n) at the resolution in the depth direction. Further similarly, in a measurement of two measurements before, data at the shallowest depth is stored as M(2, 0) and sequentially as M(2, 1) to M(2, n) at the resolution in the depth direction. Note that, although the example of storing the data columns from the three measurements (the measurements of current, previous, and two measurements before) as shown in FIG. 2 is described, the number of the stored data columns may be sequentially set according to a memory capacity. When the measurements are performed for as many times as or more than the number of the stored data columns, the oldest data column in the memory is sequentially erased, and is sequentially updated by the latest data column.

Next, the signal processing module 18 converts the reception signals stored in the memory 17 into data to be displayed on the display module 20. That is, the signal processing module 18 outputs to the display processing module 19 the reception signals sequentially stored in the memory 17 as echo data corresponding to depth, according to the elapsed time period from the output of the ultrasonic wave.

Figure 3A:
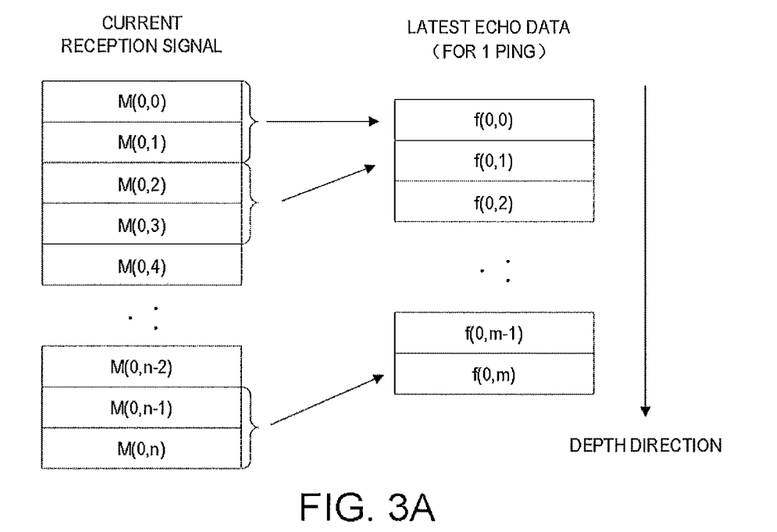
FIG. 3A is a table showing echo data and FIG. 3B is a table showing the echo data stored inside an image memory.
Figure 3B:
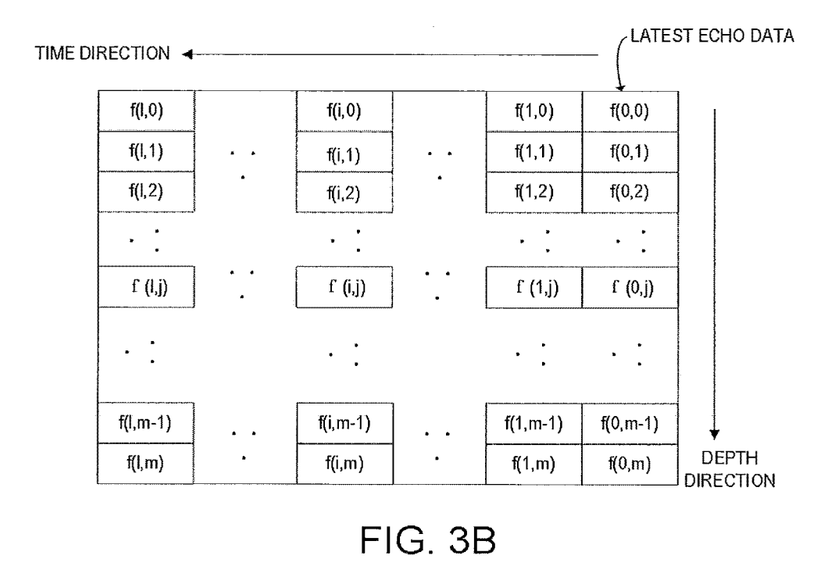

FIGS. 3A and 3B are tables showing the echo data. First, the signal processing module 18 consolidates the reception signals read out from the memory 17 according to the number of the pixels of the display module 20 (the resolution of the screen in the vertical direction). The consolidated data becomes the echo data for a single measurement (1 ping). For example, as shown in FIG. 3A, in the reception signal M(0, 0) to M(0, n) from the latest measurement, M(0, 0) and M(0, 1) are averaged to create echo data f(0, 0) of the pixel corresponding to the shallowest depth position. The signal processing module 18 sequentially averages the plurality of reception signals and creates the echo data f(0, 0) to f(0, m). The echo data thus created becomes the echo data for the latest 1 ping. Note that, the number of the consolidated data is not limited to the example shown in FIG. 3A. Further, the method of consolidating is not limited to averaging the data, and it may be, for example, weighting the data according to the respective depths.

The signal processing module 18 performs interference removal processing (described later) by using the latest echo data consolidated as described above, and outputs the data to update the contents of an image memory (RAM, not illustrated) of the display processing module 19. The display processing module 19 outputs to the display module 20 the echo data stored in the updated image memory after the interference removal processing. As a result, the echo data for a plurality of pings is displayed on the display module 20

(e.g., see FIGS. 4A to 4D). Note that, the consolidation of the data is not necessarily performed, and, when the resolution of the screen image on the display module 20 in the vertical direction is close to or the same as the resolution of the reception signal, the reception signal may be utilized as the echo data corresponding to each pixel as it is.

FIG. 3B is the view showing the echo data corresponding to the entire screen. The image memory of the display processing module 19 stores the echo data for all the pixels of the display module 20, and the echo data is sequentially updated per each ping by the signal processing module 18. The data at the right end in the screen is the latest echo data and is stored from f(0, 0) to f(0, j) and further to f(0, m). Sequentially, the echo data according to the previous ping is stored from f(1, 0) to f(1, j) and further to f(1, m), the echo data according to the ping of i times before is stored from f(i, 0) to f(i, j) and further to f(i, m), and, further, according to the number of the pixels (the resolution of the screen image in the horizontal direction) of the display module 20, the echo data is stored from f(1, 0) to f(1, j) and further to f(1, m). Note that, at the time of the initial movement (activation), the image memory is not stored with any echo data, and a background color (e.g., black) is displayed on the screen. As the time elapses, the data is sequentially updated from i=0 to i=1. When the echo data is updated as many times as or more than the number of the largest number of the pixels in the horizontal direction, the oldest data is sequentially erased.

Here, the signal processing module 18 includes an interference determining module 181 and a display signal creating module 182. The interference determining module 181 and the display signal creating module 182 perform interference detection processing and the interference removal processing. The interference detection processing is performed as follows.

First, the interference determining module 181 performs an edge extraction processing for the echo data stored in the image memory. For the plurality of measurements, an intensity difference between the latest echo data and the data from the previous measurement is extracted in the edge extraction processing. For example, a difference calculation is performed based on following Equation 1.

$$g(i,j)=f(i+1,j)-f(i,j) \quad (1).$$

Figure 4A:
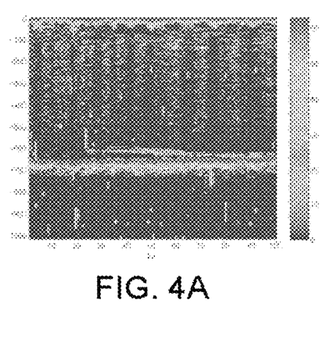
FIGS. 4A to 4D are views showing examples of screen images displayed on a display module 20.
Figure 4B:
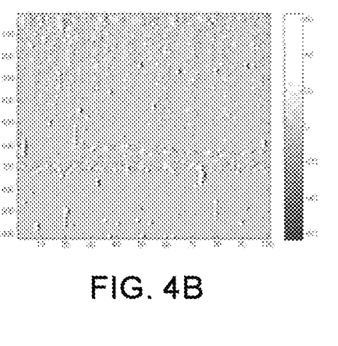

FIG. 4A is a view showing an example of an image when the echo data f(i, j) stored in the image memory is outputted as it is, and FIG. 4B is a view showing an example of an image when echo data g(i, j) after the edge extraction processing is outputted. Note that, the edge extraction processing is not limited to extracting based on the difference of the signal intensities as in the above example, and it may be a ratio of the signal intensities or extraction of a differential component.

The interference determining module 181 further performs binarization processing based on following Equation 2 to detect only a portion where the intensity dramatically rises.

$$\begin{cases} g(i,j) > th: g'(i,j) = 1 \\ g(i,j) \le th: g'(i,j) = 0. \end{cases} \quad (2)$$

Equation 2 is a calculation of detecting, by extracting only a pixel corresponding to a portion where the intensity difference is larger than a predetermined threshold th, only the edge rising portion and eliminating a portion where the intensity difference is not large. Further, because interference is unlikely to be detected to have the same intensity at the same depth, the portion where the intensity difference is not large is determined as an echo from a target object other than the interference. Note that, the threshold th may suitably be changed based on the specifics of the edge extraction processing. Alternatively, an operator may select a level of the interference removal manually, and the threshold may be changed based on the selected level. For example, the levels are set to have three of "high", "middle", and "low", and, when the operator sets the level to "the high interference removal", the threshold th is changed lower.

The interference determining module 181 extracts only portions with continuity in the depth direction so as to further remove an edge component other than the interference. First, the interference determining module 181 performs a calculation based on following Equation 3 to calculate a total number of the edge rising portions within a reference length in the depth direction.

$$sum(i,j) = \sum_{n=0}^{width-1} g'(i+n,j). \quad (3)$$

Here, the "width" indicates the reference length in the depth direction for determining whether there is continuity (corresponding to a reference time), and the total number of the edge rising portions where g'(i+n, j)=1 within a range of n=0 to width-1 is calculated. Then, the interference determining module 181 only extracts the area of the edge rising portions with a length of a reference value or longer in the depth direction. That is, the interference determining module 181 determines the area where the total number sum(i, j) of the edge rising portions is the reference value or higher as g"(i+n, j)=1 and the area where the total number is below the reference value as g"(i+n, j)=0.

Note that, in consideration of error on some extent, the area where it is short by one pixel below the threshold th (lacking of one pixel) is considered as continuous, and determined as g"(i, j)=0 as an initial value. When the total number sum(i, j) of the area where the echo data after the binarization processing is the threshold th or larger is width−1 or larger, g"(i+n, j)=1. Further, the number of the lacking pixel considered as continuous is not limited to the minimum unit (lacking of one pixel) of the resolution in the depth direction, and it may suitably be set corresponding to a desired accuracy by setting a predetermined reference number corresponding to a plurality of pixels.

Figure 4C:
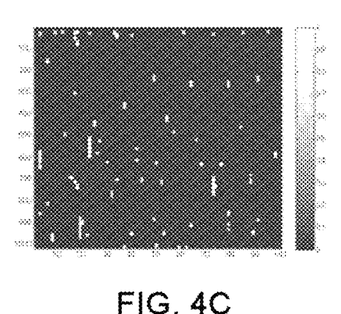

The interference determining module 181 determines that the area where g"(i+n, j)=1 is interference and the area where g"(i+n, j)=0 is not interference. FIG. 4C is a view showing an example of an image when the echo data g"(i, j) after the interference detection processing is outputted. The interference detection processing of this embodiment detects that only the portion with continuity in the depth direction as interference, therefore, interference is not determined more than needed and the interference is accurately detected comparing to the image in FIG. 4B where only the edge extraction processing is performed.

The display signal creating module 182 performs the interference removal processing based on following Equation 4 so that the interference area detected by the interference determining module 181 is removed.

$$\begin{cases} g''(i+n,j) = 0: f'(i,j) = f(i,j) \\ g''(i+n,j) = 1: f'(i,j) = \{f(i,j-1) + f(i,j+1)\}/2. \end{cases} \quad (4)$$

Figure 4D:
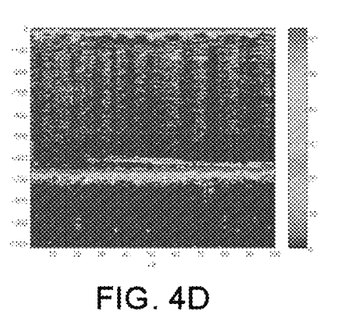

That is, the echo data in the area that is not interference is left as it is, and the area determined as interference is replaced with the value averaged by using the previous echo data and the next. The echo data f'(i, j) after the interference removal processing is outputted to the display processing module 19 and is displayed as the image. FIG. 4D is a view showing an example of an image when the echo data f'(i, j) after the interference removal processing is outputted. The image after the interference removal processing shown in FIG. 4D is what only the echo images of the interference is removed and the echo image of the target object is hardly removed comparing to the image before the interference removal processing shown in FIG. 4A.

Note that, the interference removal processing is not limited to averaging the previous echo data and the next, and it may simply be replacing the interference data with the echo data from the previous measurement. Especially, when the interference detection and removal are performed in real time, the interference removal is not performed by replacing with the averaged value using the previous echo data and the next but by replacing with the echo data from the previous measurement. That is, in the example described above, the interference detection and removal are performed for all the pixels to be displayed on the display module 20 after the echo data for the plurality of extra measurements is accumulated. However, when processing in real time, the interference detection processing is performed by using the echo data from the current measurement and the previous measurement, and the interference area is replaced with the echo data from the previous measurement.

Note that, the interference detection and removal are not limited to once, and they may be performed for a plurality of times for the echo data after the first interference removal processing. Alternatively, as an equivalent to performing the plurality of times of the interference detections, the interference detection using the data from the plurality of measurements (e.g., the measurements of current, previous, and two measurements before) may be performed. For example, when the interference signals overlap with each other at the same depth, the interference may not be detected as an edge in one time detection processing because the intensity difference at the same depth becomes small. Therefore, the interference detection processing may be repeated for the data after the first interference removal, or, alternatively, as the equivalent to performing the plurality of times of the interference detections, the interference detection using the data from the plurality of measurements (e.g., the measurements of current, previous, and two measurements before) may be performed, and thereby the accuracy can be improved. Note that, in this embodiment, even when the interference detection and removal are performed for the plurality of times, the method of detecting interference only detects the edge area with some extent of continuity in the depth direction as interference. Therefore, after the second detection processing, the possibility of detecting interference as many as or more than the interference detected in the first detection processing is extremely low, and the possibility of removing the echo of the target object is extremely low.

Further, when the operator selects the level of the interference removal manually, the repeating times of the interference detection and removal may be changed according to the selected level. For example, the levels are set to have three of "high", "middle", and "low". The interference detection and removal are repeated for three times when the operator sets the level to "the high interference removal" and twice when the operator sets the level to "the middle interference removal", and they are performed only once when the operator sets the level to "the low interference removal".

Figure 5:
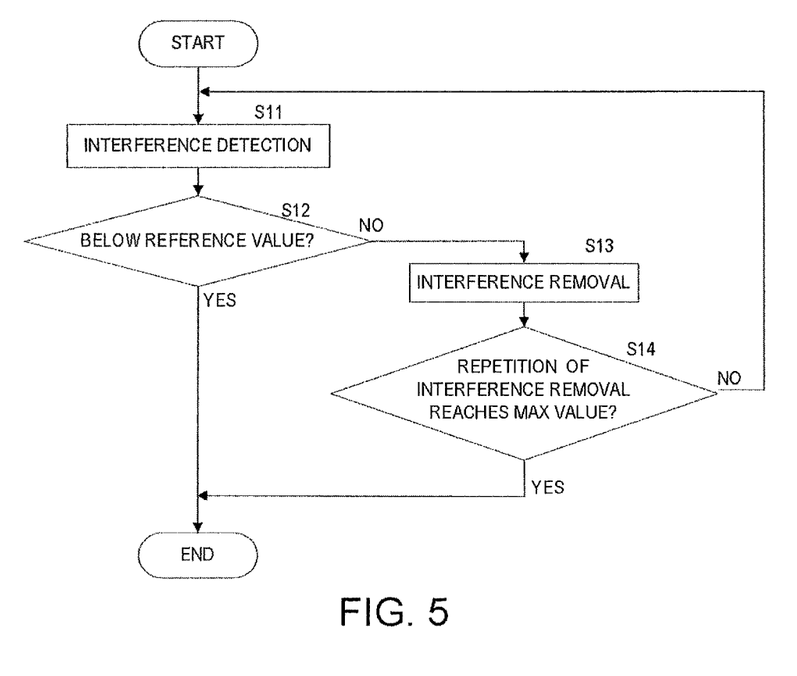
FIG. 5 is a flowchart showing an automatic adjustment performance.

Furthermore, the number of performing the interference detections and removals can automatically be adjusted. FIG. 5 is a flowchart when the automatic adjustment is performed. The interference determining module 181 of the signal processing module 18 firstly performs the interference detection processing based on above described Equations 1 to 4 (S11). Further, the interference determining module 181 determines whether the number of the detected interference is below the reference value (S12). The number of the interference may be the total number of the pixels which is determined as the interference. Alternatively, the continuous interference area may be considered as a group and the number of the interference may be obtained by calculating the number of the groups. In the signal processing module 18, if the number of the interference detected by the interference determining module 181 is below the reference value, the display signal creating module 182 does not perform the interference removal and the echo data is outputted to the display processing module 19.

On the other hand, in the signal processing module 18, if the number of the interference detected by the interference determining module 181 is the reference value or higher, the display signal creating module 182 performs the interference removal based on Equation 4 (S13), and then the interference determining module 181 determines whether the repetition of the interference removal which is performed reaches the maximum value (S14). The maximum value is, for example, three in this embodiment. When the interference removal is performed for three times, the signal processing module 18 does not perform further interference detection and removal, and outputs the echo data to the display processing module 19. On the other hand, if the repetition of the interference removal which is performed has not reached the maximum value, the signal processing module 18 repeats the processing from the interference detection once more for the echo data after the interference removal. Note that, although the maximum value is not required to be set, an extended time may be needed for outputting the image due to the processing ability of and a processing load on the signal processing module 18, therefore the maximum value is desirable to be set.

Images when the automatic adjustment is performed as above are show in FIG. 6. FIG. 6A is a view showing an example of the image when the echo data before the interference detection processing is outputted. FIG. 6B is a view showing an example of the image when the echo data g"(i, j) after the first interference detection processing is outputted. FIG. 6C is a view showing an example of the image when the echo data g"(i, j) after the second interference detection processing is outputted. FIG. 6D is a view showing an example of the image when the echo data g"(i, j) after the third interference detection processing is outputted. FIG. 6E is a view showing an example of the image when the echo data f'(i, j) after the second interference removal processing is outputted. FIG. 6F is a view showing an example of the image when the echo data f'(i, j) after the third interference removal processing is outputted.

Figure 6A:
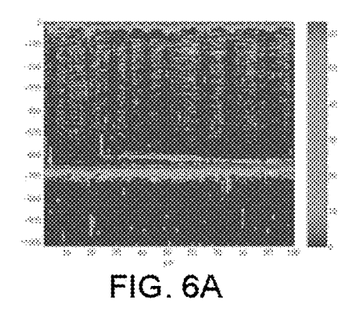
FIGS. 6A to 6F are views showing examples of screen images displayed on the display module 20 after the automatic adjustment.
Figure 6B:
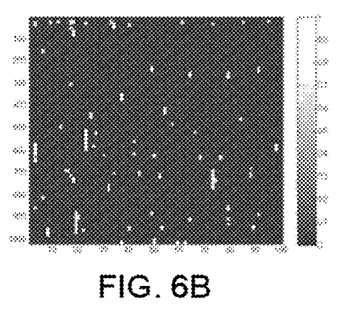
Figure 6C:
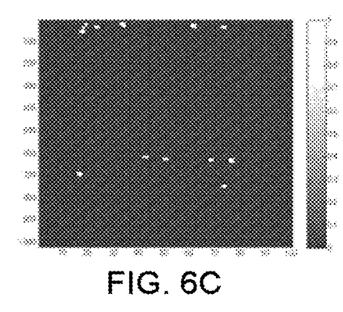
Figure 6D:
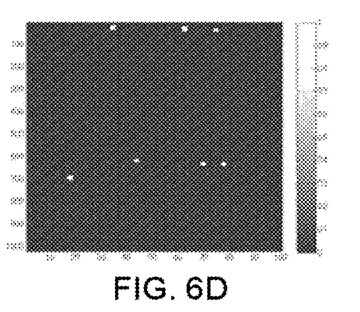
Figure 6E:
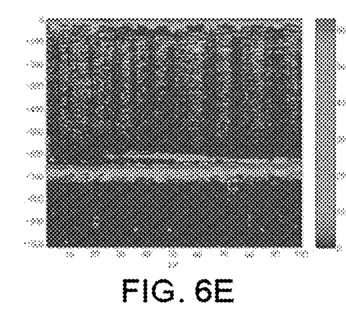
Figure 6F:
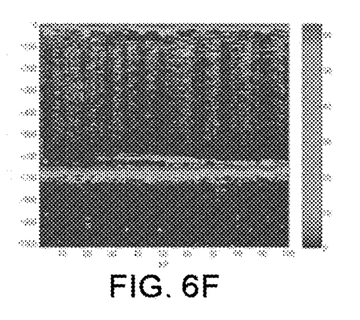

As shown in FIGS. 6B to 6D, in the second and third interference detection processing, only the interference that accidentally overlaps at the same depth in the current and previous reception signals and is not completely removed in the previous processing is detected and removed comparing to the first interference detection processing. Thereby, the interference removal is not performed more than needed and the accuracy can further be improved. Note that, with the relatively small number of interferences shown in FIG. 6D, the reference value in S12 of FIG. 5 may be changed, and the third interference detection and removal processing may not be performed. It is effective for reducing the processing load when the image does not change greatly in visual, as shown in FIGS. 6E and 6F.

Note that, in this embodiment, the interference detection and removal are performed after consolidating the reception signals stored in the memory 17 as the echo data to be displayed; however, the interference detection and removal may be performed by using the reception signals stored in the memory 17 as they are. In this regard, in the fish finder, the operator visually determines whether it is interference or the target object from the echo image on the display module in the end, therefore, performing the interference detection and removal per pixel to be displayed is desirable in the sight of processing load and accuracy.

Further, in this embodiment, the example where the interference detection and removal are performed by the signal processing module 18; however, the interference detection and removal may be performed by the control module 14, or by a hardware serving as a dedicated interference detecting module.

Furthermore, in this embodiment, the fish finder is described; however, the present invention can be applied to other devices, such as a radar apparatus, where interference may be generated.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a," "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A detection device, comprising:
   a transceiver configured to transmit transmission signals and receive respective echo signals caused by the transmission signals to output respective reception signals, with each of the respective reception signals being based on a respective intensity of a respective one of the echo signals;
   a memory configured to store the respective reception signals for a plurality of measurements; and
   a signal processor configured to create respective echo data based on a plurality of the respective reception signals, determine a difference between the echo data corresponding to a latest measurement at a depth and the echo data corresponding to a previous measurement at the depth, and compare the difference to a predetermined threshold to determine whether the reception signal for the latest measurement at the depth includes an interference signal.

2. The detection device of claim 1, further comprising an image output configured to output the reception signals as echo images according to the intensities, wherein the signal processor sets a reference time period pertaining to the depth based on the total number of pixels of the image output.

3. The detection device of claim 1 or 2, wherein the signal processor repeats the determination of the interference signal for a reception signal from which the interference signal is removed.

4. The detection device of claim 3, wherein the signal processor repeats the determination of the interference signal when the number of the interference signals contained in the reception signals is more than a reference value.

5. The detection device of claim 1 or 2, further comprising an interference remover configured to remove the interference signal from the reception signal; and
   wherein the signal processor repeats the determination of the interference signal for the reception signal from which the interference signal is removed.

6. The detection device of claim 5, wherein the interference remover removes the interference signal by replacing the interference signal with a value of the reception signal other than the interference signal.

7. The detection device of claim 5, wherein the interference remover removes the interference signal by replacing the interference signal with a corresponding value of the previous reception signal.

* * * * *